United States Patent Office 3,449,316
Patented June 10, 1969

3,449,316
PROCESS FOR THE PURIFICATION OF GAMMA GLOBULIN EMPLOYING BENTONITE
Merle Vernon Querry, Westwood, N.J., assignor to American Cyanamid Company, Stamford, Conn., a corporation of Maine
No Drawing. Filed Mar. 3, 1967, Ser. No. 620,238
Int. Cl. C07g 7/00; A61k 17/00
U.S. Cl. 260—112                 9 Claims

ABSTRACT OF THE DISCLOSURE

The process herein disclosed relates to a process of purifying gamma globulin employing an alumina and silica containing adsorbent material. In particular, the process entails dissolving gamma globulin in a physiological saline solution, having a molar concentration of about 0.1 to 0.2 M, adjusting the pH to about 6 to 8.5, adding from about 1 to 5% by weight of bentonite, based on the total volume of the solution, agitating and filtering the mixture, and recovering gamma globulin from the filtrate.

---

Generally stated, the subject matter of the present invention relates to a process of purifying gamma globulin. More particularly, the invention relates to a process of purifying gamma globulin, which comprises treating gamma globulin with an alumina and silica containing adsorbent material.

BACKGROUND OF THE INVENTION

The alcohol process of purifying gamma globulin from plasma and serum is widely employed since the process permits the treatment of large quantities of material, assures a high degree of purification, as well as preserving the biological properties of gamma globulin. However, the alcohol process has several disadvantages inherent in its use: first, the complexity and duration of the process; second, significant losses of gamma globulin occasioned by the number of manipulative steps in the process; third, the necessity of employing special equipment, since the process is conducted entirely at low temperatures, —5 to —6° C., thereby resulting in substantial increases in cost; lastly, since the purified product frequently degrades to a 4S component, the therapeutic efficacy of gamma globulin is materially affected. The 4S component is defined as the degradation component of gamma globulin, which is rapidly excreted and thereby affects the therapeutic efficacy of gamma globulin.

Recently, a combined alcohol, 6,9-diamino-2-ethoxyacridine lactate process has been developed. The process constitutes a modification of the basic alcohol process; and the modification resides in the removal of the alpha and beta globulins. The alcohol process removes both the alpha and beta globulins by alcohol fractionation; whereas, the modified process employs 6,9-diamino-2-ethoxyacridine lactate to precipitate the alpha and beta globulins from the gamma globulin. The process then resorts to the conventional alcohol precipitation of gamma globulin from the filtrate. The modified process, while overcoming some of the inherent disadvantages of the alcohol process, does not effect the degradation of gamma globulin to the 4S component.

The present invention represents the culmination of a long series of investigations conducted largely by the inventor and his associates in the inherent problem of gamma globulin degradation of the 4S component. The inventive concept resides in the discovery that the treatment of gamma globulin with an alumina and silica containing adsorbent material obviates the problem of degradation of gamma globulin to the 4S component.

SUMMARY OF THE INVENTION

Therefore, the invention relates to a process of purifying gamma globulin which comprises dissolving gamma globulin in a physiological saline solution, having a molar concentration of from about 0.1 to 0.2 M, adjusting the pH to about 6 to 8.5, adding from about 1 to 5% by weight of bentonite, based on the total volume of the solution, agitating and filtering the mixture, and recovering gamma globulin from the filtrate. Furthermore, the invention relates to the purified gamma globulin obtained by the process of the present invention.

The concentration of bentonite employed in the novel process of the present invention is dependent on a variety of factors, the most notable of which relates to the nature of the starting material. For example, gamma globulin which has been treated to remove the alpha and beta globulins requires 1 to 2% of bentonite to effect removal of that factor which is responsible for the degradation of gamma globulin to the 4S component. Whereas, gamma globulin which has not been treated to remove the alpha and beta globulins requires concentrations as high as 5% of bentonite since the alpha and beta globulins compete for the bentonite with that factor responsible for the degradation of gamma globulin to the 4S component. The use of concentrations greater than 5% should be avoided since the gamma globulin tends to be adsorbed by the bentonite. Furthermore, the concentration of gamma globulin in the physiological saline solution is an additional factor which warrants consideration, and it is preferred to employ a concentration of 1% by weight.

As employed in the instant specification and claims, bentonite shall be defined as any montmorillonite clay which displays strong colloidal properties, and when in contact with water increases its volume severalfold by swelling, giving rise to a thioxotropic, gelatinous substance. Additionally, it should be noted that in the following examples bentonite alone is employed, however, for the purposes of this invention alumina and silica containing adsorbent materials generally may be employed, including, for example, kieselguhr and the like.

The advent of the present invention thereby obviates one of the inherent disadvantages of both the alcohol process of purification, as well as the combined alcohol, 6,9-diamino-2-ethoxyacridine lactate process, since gamma globulin prepared according to the process of the present invention does not readily degrade to the 4S component and thereby meets the highest criteria of therapeutic efficacy.

Broadly speaking, the manner of carrying out this invention is as follows: Approximately 33 grams of gamma globulin is added to 3.3 liters of cold physiological saline solution, having a molar concentration of 0.1 to 0.2 M, preferably 0.15 M, and the pH is then adjusted to a pH of about 6 to 8.5, preferably 8. Bentonite is then added in a concentration of 1 to 5%, and the mixture is stirred at 2° C. for 1 hour. The mixture is centrifuged and clarified by filtration. An equal volume of water is added to the filtrate, and the pH is adjusted to 7.4. Methanol is then added to a concentration of 25%, resulting in a precipitation of the gamma globulin. The precipitate is collected, lyophilized, reconstituted to a 16% solution with 0.3 M glycine, and preserved with 1:10,000 merthiolate.

It is preferred to incorporate disodium phosphate in the physiological saline solution to a molar concentration of 0.05 M. Furthermore, it is preferred to filter the physiological saline, gamma globulin solution prior to adjusting the pH, thereby effecting the removal of the insoluble portion of the starting material which competes for the bentonite with that factor responsible for the degradation of gamma globulin to the 4S component. The filtrate is then adjusted to 0.05 M with respect to disodium phosphate, and adjusted to a pH of 6 to 8.5.

The following examples are provided for illustrative purposes and may include particular features of the invention, however, the examples should not be construed as limiting the invention, many variations of which are possible without departing from the spirit or scope thereof.

Example I.—Purification of gamma globulin employing a combined alcohol, 6,9-diamino-2-ethoxyacridine lactate process This example demonstrates a process of purifying gamma globulin from whole placentas employing a combined alcohol, 6,9-diamino-2-ethoxyacridine lactate process and, furthermore, demonstrates the high degree of degradation of the purified gamma globulin thereby obtained.

A portion of whole placenta is ground, extracted with 0.15 M saline solution and the meat pulp is discarded. The saline suspension is then treated with methanol to a concentration of 25% at −5° C. Gamma globulins plus alpha and beta globulins precipitate and are collected. One kilogram of the precipitated globulin is suspended in 5 liters of 0.15 M saline, and then 8 liters of 0.4% solution of 6,9-diamino-2-ethoxyacridine lactate is added. Upon the addition of the 6,9-diamino-2-ethoxyacridine lactate the alpha and beta globulins are precipitated, and the filtrate, which is retained, is treated with methanol to a concentration of 50%. The precipitate which forms is collected and suspended in 23 liters of 0.06 M saline solution. Methanol is added to a concentration of 25%, and the gamma globulin which precipitates is collected, lyophilized, reconstituted to a 16% solution with 0.3 M glycine solution, and preserved with 1:10,000 merthiolate.

A sample of the above purified material is incubated at 37° C. for 5 weeks. At the end of this period the purified material contains 20 to 30% of the 4S component.

Example II.—Purification of gamma globulin employing the novel process of the present invention This example demonstrates the purification of gamma globulin employing the novel process of the present invention. Furthermore, the example demonstrates a substantial elimination of the degradation of purified gamma globulin to the 4S component.

A portion of whose placenta is ground, extracted with 0.15 M saline solution and the meat pulp is discarded. The saline suspension is then treated with methanol to a concentration of 25% at −5° C. Gamma globulins plus alpha and beta globulins precipitate and are collected. One kilogram of the precipitated globulin is suspended in 5 liters of 0.15 M saline, and 8 liters of a 0.4% solution of 6,9-diamino-2-ethoxyacridine lactate is added. Upon the addition of the 6,9-diamino-2-ethoxyacridine lactatae the alpha and beta globulin are precipitated, and the filtrate, which is retained, is treated with methanol to a concentration of 50%. The precipitate is resuspended in 3.3 liters of cold 0.15 M saline solution and filtered. The filtrate is adjusted to 0.05 M with respect to disodium phosphate, and adjusted to a pH of 7 to 8. Bentonite, at a concentration of 1 to 2%, is added and the mixture is stirred at 2° C. for 1 hour. The mixture is centrifuged, clarified by filtration and an equal volume of water is added to the filtrate, adjusting the pH to 7.4. Methanol is added to a concentration of 25%, and the gamma globulin which precipitates is collected, lyophilized, reconstituted to a 16% solution with 0.3 M glycine solution, and preserved with 1:10,000 merthiolate.

A sample of the above material is incubated at 37° C. for 4 weeks. At the end of this period only a trace amount, 1%, of the 4S component is present. A second sample is incubated at 37° C. for 8 weeks, and at the end of this period the purified material contains 2 to 5% of the 4S component. This clearly demonstrates the beneficial results of the novel process of the instant invention when compared with the inordinately high concentration of 4S component present in the material prepared in Example I.

Although the invention has been described and illustrated by reference to particular embodiments thereof, it will be understood that in its broadest aspects the invention is not limited to such embodiments, and that variations and substitution of such equivalents may be resorted to within the scope of the appended claims.

I claim:
1. A process which comprises dissolving gamma globulin in a physiological saline solution, having a molar concentration of about 0.1 to 0.2 M, adjusting the pH to about 6 to 8.5, adding bentonite to about a 1 to 5% concentration by weight, based on the total volume of the solution, agitating and filtering the mixture, and recovering gamma globulin from the filtrate.
2. A process according to claim 1, in which the physiological saline solution has a molar concentration of 0.15 M.
3. A process according to claim 1, in which the physiological saline solution contains disodium phosphate in a molar concentration of 0.05 M.
4. A process according to claim 1, in which the gamma globulin is dissolved to a concentration of about 1% by weight.
5. A process according to claim 1, in which the gamma globulin solution is filtered prior to adjusting the pH.
6. A process according to claim 1, in which the pH is adjusted to 8.
7. A process according to claim 1, in which the bentonite is added to a concentration of about 1 to 2% by weight.
8. A process according to claim 1, in which the agitation is carried out at 2° C. for 1 hour.
9. A process according to claim 1, in which gamma globulin is recovered from the filtrate by a process which comprises adding an equal volume of water to the filtrate, adjusting the pH to 7.4, adding methanol to a concentration of about 25%, which results in precipitation of the gamma globulin, collecting and lyophilizing the precipitate, reconstituting the lyophilized precipitate to a 16% solution, by weight, with 0.3 M glycine, and preserving the solution with 1:10,000 merthiolate.

References Cited

UNITED STATES PATENTS

| | | | |
|---|---|---|---|
| 2,390,074 | 10/1945 | Cohn | 260—122 |
| 2,761,811 | 9/1956 | Kupferberg et al. | 424—11 |
| 3,083,194 | 3/1963 | Thies et al. | 260—112 |
| 3,382,227 | 5/1968 | West et al. | 260—112 |

OTHER REFERENCES

Chem. Abstracts, vol. 46, 1952, 11463 h–i, Nikkila et al.
Chem. Abstracts, vol. 54, 1960, 11132 a–c, Soulier.
Chem. Abstracts, vol. 55, 1961, 9519 c–e, Niewiarowski.
Chem. Abstracts, vol. 58, 1963, 7232 e–f, DeNicola et al.
Chem. Abstracts, vol. 60, 1964, 7067 a–b, Nishida et al.
Chem. Abstracts, vol 60, 1964, 13662 g–h, 13663 a–b, Olesen et al.

WILLIAM H. SHORT, *Primary Examiner*.

H. SCHAIN, *Assistant Examiner*.

U.S. Cl. X.R.

424—101, 359